(12) United States Patent
Verduijn et al.

(10) Patent No.: US 7,264,789 B1
(45) Date of Patent: *Sep. 4, 2007

(54) CRYSTALLINE MOLECULAR SIEVES

(75) Inventors: Johannes Petrus Verduijn, deceased, late of Leefdaal (BE); by Jannetje Maatje Van Den Berge, legal representative, Oostvoorne (NL); Machteld Maria Wilfried Mertens, Boortmeerbeek (BE); Marcel Johannes Janssen, Kessel-Lo (BE); Cornelius Wilhelmus Maria Van Oorschot, Machelen (BE); David E. W. Vaughan, State College, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/744,705

(22) PCT Filed: Jul. 28, 1999

(86) PCT No.: PCT/GB99/02468

§ 371 (c)(1),
(2), (4) Date: May 3, 2005

(87) PCT Pub. No.: WO00/06494

PCT Pub. Date: Feb. 10, 2000

(30) Foreign Application Priority Data

Jul. 29, 1998 (GB) ................................. 9816505.3
Jul. 29, 1998 (GB) ................................. 9816508.7

(51) Int. Cl.
*C01B 39/46* (2006.01)
(52) U.S. Cl. .................. 423/716; 423/709; 208/46
(58) Field of Classification Search ................ 423/709, 423/716; 208/46
See application file for complete search history.

(56) References Cited

U.S. PATENT DOCUMENTS

| | | | |
|---|---|---|---|
| 4,007,253 A | 2/1977 | Puppe et al. | |
| 4,166,099 A | 8/1979 | McDaniel et al. | 423/329 |
| 4,260,495 A | 4/1981 | Bennoit et al. | |
| 4,340,573 A | 7/1982 | Vaughan et al. | |
| 4,495,303 A | 1/1985 | Kuehl | 502/62 |
| 4,650,655 A | 3/1987 | Chu et al. | |
| 5,863,516 A * | 1/1999 | Otterstedt et al. | 423/700 |
| 6,821,503 B1 * | 11/2004 | Verduijn et al. | 423/709 |

FOREIGN PATENT DOCUMENTS

| | | |
|---|---|---|
| EP | 0 002 960 | 7/1979 |
| EP | 0 026 394 | 7/1982 |
| EP | 0107370 | 5/1984 |
| EP | 0110650 | 6/1984 |
| EP | 0 170 486 | 2/1986 |
| EP | 0 437 989 | 3/1994 |
| EP | 0 753 483 | 1/1997 |
| EP | 0 753 484 | 1/1997 |
| EP | 0 753 485 | 1/1997 |
| GB | 1 062 064 | 3/1967 |
| GB | 2 031 865 | 4/1980 |
| GB | 1 567 948 | 5/1980 |
| JP | 05293369 | 11/1993 |
| NL | 8603170 | 7/1987 |
| SU | 1503221 | 10/1991 |
| WO | WO 93/08124 | 4/1993 |
| WO | 94/25151 | 11/1994 |
| WO | 97/03019 | 1/1997 |
| WO | WO 97/03020 | 1/1997 |
| WO | WO 97/03021 | 1/1997 |
| WO | WO9816469 | 4/1998 |

OTHER PUBLICATIONS

A. Dyer, "An Introduction to Zeolite Molecular Sieves", John Wiley & Sons, (1988), pp. 136-139.
Caullet et al., "Synthesis of LEV-type zeolite from aqueous nonalkaline fluoride aluminosilicate gels", Zeolites, 15: pp. 139-147 (1995).

* cited by examiner

*Primary Examiner*—David Sample

(57) ABSTRACT

A colloidal suspension of LEV structure type crystalline molecular sieve, making the suspension by washing smaller crystallites from a previously found solid LEV product, and using the suspension as seeds in further crystalline molecular sieve syntheses.

22 Claims, No Drawings

CRYSTALLINE MOLECULAR SIEVES

This invention relates to molecular sieves and processes for their manufacture. More especially it relates to processes in which synthesis mixtures are seeded to control process conditions and product characteristics, to compositions for providing seeds in such processes, and to methods of obtaining such compositions.

It is well known that seeding a molecular sieve synthesis mixture frequently has beneficial effects, for example in controlling the particle size of the product, avoiding the need for an organic template, accelerating synthesis, and improving the proportion of product that is of the intended structure type.

Colloidal seeds have proved especially effective, as described in International Application No. WO 97/03019, 03020, and 03021, and EP-A-753 483, 753 484, and 753 485. Whereas procedures for the preparation of colloidal dispersions of certain structure types have been described in the above-mentioned references, and similar procedures are effective in the preparation of colloidal dispersions of crystalline molecular sieves of other structure types, these procedures have proved ineffective in the preparation of colloidal dispersions of certain further structure types, especially LEV.

As used in this specification, the term "structure type" is used in the sense described in the Structure Type Atlas, Zeolites 17, 1996.

It has now been found that colloidal LEV may be produced by a completely different method, and that a colloidal LEV structure type crystalline molecular sieve, especially in the form of a colloidal dispersion, has valuable properties in seeding the manufacture of crystalline molecular sieves.

The present invention provides, in a first aspect, a colloidal suspension of a LEV structure type crystalline molecular sieve.

The present invention also provides a method for preparing a colloidal suspension of LEV by synthesizing a LEV structure type crystalline molecular sieve by treatment of an appropriate synthesis mixture, separating the product from the synthesis mixture, washing the product, and recovering the resulting wash liquid.

Without wishing to be bound by any theory, it is believed that the LEV produced by a conventional LEV synthesis comprises LEV particles of greater size, normally in excess of 1 μm, intermixed with particles of colloidal size, which are separable from the larger particles by conventional water-washing processes. It has been observed that while the first wash water may sometimes be clear, and may contain no or very few colloidal particles, the second or subsequent wash water is not clear, and has a measurable solids content. The resulting wash waters are colloidal suspensions or dispersions of LEV crystallites, which have considerable utility as sources of seeds in crystalline molecular sieve manufacture. (If desired, the dispersions may be made more concentrated before use.)

The colloidal LEV seeds of the invention and produced by a method according to the invention are especially suitable for use in syntheses to produce crystalline molecular sieves of the LEV, FER, MOR, ERI/OFF, MAZ, OFF, ZSM-57, and CHA structure types. Examples of CHA materials are Chabasite and the phosphorus-containing molecular sieves SAPO-, AlPO-, MeAPO-, MeAPSO-, ElAPSO- and ElAPO-37 and especially the corresponding -34 materials. In these formulae, El represents magnesium, zinc, iron, cobalt, nickel, manganese, chromium or mixtures of any two or more such elements. Examples of MAZ materials include mazzite, zeolite omega, and ZSM-4. Colloidal LEV structure type seeds may also be used in the synthesis of phosphorus-containing crystalline molecular sieves, e.g., SAPO-, AlPO-, MeAPO-, MeAPSO-, ElAPSO- and ElAPO- materials, of the LEV structure type, e.g., the −35 materials. (Where a material is referred to as, for example, a SAPO material, this terminology includes the possibility that additional elements may be present, either in the framework or otherwise). LEV structure type zeolites may also be prepared using the colloidal seeds of the invention, for example Levyne, ZK-20, NU-3 and ZSM-45.

As used herein, the term "colloidal", when used of a suspension, refers to one containing discrete finely divided particles dispersed in a continuous liquid phase and preferably refers to a suspension that is stable, in the sense that no visible separation occurs or sediment forms, in a period sufficient for the use intended, advantageously for at least 10, more advantageously at least 20, preferably at least 100, and more preferably at least 500, hours at ambient temperature (23° C.). The maximum size of the particles for the suspension to remain stable (peptized) will depend to some extent on their shape, and on the nature and pH of the continuous medium, as well as on the period during which the suspension must remain usable. In general, the maximum dimension will be 1 μm, advantageously 500, more advantageously 400, preferably 300, more preferably 200, and most preferably 100, nm. The particles may be spherical, or of other shapes. Where particles are other than spherical, the dimension referred to is their smallest dimension.

The minimum dimension is such that the particles do not dissolve or re-dissolve in the medium, and for crystallinity they must contain at least a small plurality, advantageously at least two, preferably four, unit cells of the crystal. The minimum particle size is in general 5, advantageously 10, and preferably 20, nm. Mean particle sizes are generally in the range 5 to 1000, advantageously 10 to 300, more advantageously 10 to 200, and preferably 20 to 100, nm. Advantageously at least 50%, more advantageously at least 80%, and more preferably at least 95%, by number, of the particles are greater than the given minima, smaller than the given maxima, or within the given ranges of particle size. Measurements of particle size may be effected by electron microscopy, for example using a Philips SEM 515 unit.

As indicated above, the colloidal seeds of the invention have utility in the manufacture of a variety of crystalline molecular sieves by incorporating the seeds as a component of a synthesis mixture. They are advantageously incorporated in the synthesis mixture in the form of a suspension, advantageously in an aqueous medium, preferably water, or another liquid component of the synthesis mixture. Less preferably they may be added in dry, but not calcined, form. It is believed that calcination significantly reduces the activity of small crystallites to act as seeds; similarly any other treatment that reduces the seeding activity of materials should be avoided.

The colloidal seeds are generally present in the synthesis mixture in a concentration of up to 10000, advantageously at most 3000, more advantageously at most 1500, and preferably at most 1000, more preferably at most 500, and most preferably at most 350 ppm, based on the total weight of the synthesis mixture. A minimum seeding level is generally 1 ppb (0.001 ppm), advantageously at least 0.1, more advantageously at least 1, and preferably at least 10, ppm, based on the total weight of the synthesis mixture.

Advantageous ranges of proportions are from 1 to 2000, preferably 100 to 1500, and most preferably 100 to 250, ppm.

Apart from the presence of the seeds, the synthesis mixture used is typically one that is known in the art or as described in the literature as suitable for the production of the molecular sieve concerned. This is also the case for the conditions of treatment, except that the presence of the seeds may make possible the reduction of reaction times or may obviate stirring if that were otherwise necessary.

In general, the treatment of the synthesis mixture to yield the desired crystalline molecular sieve, usually termed hydrothermal treatment, though strictly that term should be used only for treatments in which there is vapour-phase water present, is advantageously carried out under autogenous pressure, for example in an autoclave, for example a stainless steel autoclave which may, if desired, be ptfe-lined. The treatment may, for example, be carried out at a temperature within the range of from 50, advantageously from 90, especially 120, to 250° C., depending on the molecular sieve being made. The treatment may, for example, be carried out for a period within the range of from 20 to 200 hours, preferably up to 100 hours, again depending on the molecular sieve being formed. The procedure may include an ageing period, either at room temperature or, preferably, at a moderately elevated temperature, before the hydrothermal treatment at more elevated temperature. The latter may include a period of gradual or stepwise variation in temperature.

For certain applications, the treatment is carried out with stirring or with rotating the vessel about a horizontal axis (tumbling). For other applications, static hydrothermal treatment is preferred. If desired, the synthesis mixture may be stirred or tumbled during an initial part of the heating stage, for example, from room temperature to an elevated, e.g., the final treatment, temperature, and be static for the remainder. Agitation generally produces a product with a smaller particle size and a narrower particle size distribution than static hydrothermal treatment.

If the product is desired in small particle size form, a larger number of smaller sized LEV seeds is desirably employed. The smaller the mean particle size of the seeds, the lower the weight percentage that is effective. The crystals are advantageously stirred into the synthesis mixture for a time sufficient to provide a uniform dispersion, this time being dependent primarily on the viscosity of the synthesis mixture, and also the scale and type of equipment, but ranging generally from 30 seconds to 10 minutes.

The present invention accordingly provides in a second aspect a process for the manufacture of a crystalline molecular sieve, which process comprises treating a synthesis mixture comprising elements necessary to form the molecular sieve and colloidal LEV crystalline molecular sieve seeds for a time and at a temperature appropriate to form the desired molecular sieve.

As mentioned above, the LEV seed crystals may be used in the manufacture of a molecular sieve of a structure type other than LEV. Such seeding may be regarded as "heterostructural", whereas seeding with seeds of the same structure type is termed "isostructural", whether or not the seeds are of the same composition (i.e., contain the same elements in the same proportions) as the crystalline molecular sieve to be produced.

The present invention accordingly provides in a third aspect a process for the manufacture of a crystalline molecular sieve, which comprises treating a synthesis mixture comprising elements necessary to form a molecular sieve of a first structure type, other than LEV, and colloidal LEV molecular sieve seed crystals for a time sufficient and at a temperature appropriate to form the molecular sieve of the first structure type.

In some embodiments of this aspect, the structure types of the desired molecular sieves are topologically similar to LEV, i.e., are members of the ABC-6 group of materials, as described in Topochemistry of Zeolites and Related Materials, J. V. Smith, Chem. Rev. 1988, 88, 149 at 167, the disclosure of which is incorporated herein by reference. The ABC-6 group includes, inter alia, the Offretite and Chabazite, as well as the Levyne, structures. In other embodiments, topologically dissimilar structure types, e.g., MOR, FER, MAZ, EUO, and MFS, are produced.

In further aspects, the invention provides the use, in the synthesis of a crystalline molecular sieve, of colloidal LEV seed crystals to avoid the need for an organic template, to produce different morphologies, or to control the morphology, of the product, to control the purity, particle size or particle size distribution of the product, or to accelerate the formation of the product, or to achieve two or more such effects.

Also as indicated above, colloidal LEV seeds are especially suitable in the manufacture of phosphorus-containing molecular sieves, more especially aluminophosphates and silicoaluminophosphates. They are also especially useful in the manufacture of a colloidal suspension of a crystalline molecular sieve of another structure type, especially CHA.

The invention also provides the products of the processes and of the uses of the earlier aspects of the invention. The products, if required after cation exchange and/or calcining, have utility as catalyst precursors, catalysts, and separation and absorption media. They are especially useful in numerous hydrocarbon conversions, separations and absorptions. They may be used alone, or in admixture with other molecular sieves, in particulate form, supported or unsupported, or in the form of a supported layer, for example in the form of a membrane, for example as described in International Application WO 94/25151. Hydrocarbon conversions include, for example, cracking, reforming, hydrofining, aromatization, oligomerisation, isomerization, dewaxing, and hydrocracking (e.g., naphtha to light olefins, higher to lower molecular weight hydrocarbons, alkylation, transalkylation, disproportionation or isomerization of aromatics). Other conversions include the reaction of alcohols with olefins and the conversion of oxygenates to hydrocarbons.

Conversion of oxygenates may be carried out with the oxygenate, e.g., methanol, in the liquid or, preferably, the vapour phase, in batch or, preferably, continuous mode. When carried out in continuous mode, a weight hourly space velocity (WHSV) based on oxygenate, of advantageously 1 to 1000, preferably 1 to 100, hour$^{-1}$ may conveniently be used. An elevated temperature is generally required to obtain economic conversion rates, e.g., one between 300 and 600° C., preferably from 400 to 500° C., and more preferably about 450° C. The catalyst may be in a fixed bed, or a dynamic, e.g., fluidized or moving, bed.

The oxygenate feedstock may be mixed with a diluent, inert under the reaction conditions, e.g., argon, nitrogen, carbon dioxide, hydrogen, or steam. The concentration of methanol in the feedstream may vary widely, e.g., from 5 to 90 mole percent of the feedstock. The pressure may vary within a wide range, e.g., from atmospheric to 500 kPa.

The following Examples, in which parts are by weight unless otherwise indicated, illustrate the invention. The source and purity of starting materials are those first given, unless indicated otherwise.

EXAMPLE 1

This example illustrates the manufacture of a colloidal LEV-type zeolite.

In a first stage, 15.95 parts of sodium aluminate (Dynamit Nobel, 53% $Al_2O_3$, 41% $Na_2O$, 6% $H_2O$), 19.95 parts of sodium hydroxide (Baker, 98.6%) and 5.58 parts of potassium hydroxide (Baker, 87.4%) were dissolved in 151.06 parts of water, and heated to boiling until a clear solution was obtained. After cooling to room temperature, water loss was compensated, to form Solution A. 270.60 parts of colloidal silica (Ludox HS40, 40% $SiO_2$) were mixed with 106.12 parts of choline chloride (R, Fluka) forming a viscous mass, and Solution A added with stirring at increasing speed as the viscosity decreased, together with 190 parts of rinse water, mixing then continuing for a further 5 minutes. The molar composition was:

$1.95Na_2O:0.24K_2O:0.46Al_2O_3:10SiO_2:4.187R:155H_2O$.

To 290 parts of this mixture, 0.49 parts of conventional LEV zeolite seeds were added, and a sample transferred to an autoclave, where it was heated in a 120° C. oven for 144 hours. The product was washed, recovered by centrifuging and dried overnight at 120° C. The product comprised spherical aggregates of from 2 to 2.5 µm, made up of ~100 nm particles, with an X-ray diffraction pattern (XRD) of ZSM-45, a zeolite of LEV-type structure, as described in EP-A-107 370 (Mobil).

The product was used as seeds in the next stage, in which 8.38 parts of sodium aluminate, 10.53 parts of sodium hydroxide, 2.96 parts of potassium hydroxide, and 78.95 parts of water were treated as described above to form a Solution A. Solution A was then added to a mixture of 142.42 parts of colloidal silica and 55.5 parts of choline chloride, together with 100.00 parts of rinse water and mixed as described above, with the addition of 0.68 parts of the first stage seeds. The reaction mixture was heated in an autoclave at 120° C. for 174 hours, the product recovered by washing, centrifuging and drying having an XRD similar to that of the first stage. The second supernatant of the washing procedure was not clear, and had a pH of 10.3. It was found to be a dispersion with a solids content of 2.3%. Analysis by scanning electron microscopy (SEM) and XRD showed ~100 nm crystals with a ZSM-45 structure, LEV structure type.

EXAMPLE 2

This example illustrates use of a colloidal LEV suspension in the manufacture of a chabasite dispersion suitable for use, in turn, for seeding in SAPO-34 manufacture. The colloidal LEV seeds were prepared as follows:

A synthesis mixture was prepared as described in the first part of Example 1, except that as seeds the colloidal sol from the second supernatant of the second part of Example 1 was used, at a seeding level of 0.15% by weight of solids. The seeded synthesis mixture was heated in a stainless steel autoclave for 96 hours at 120° C., with a heat-up time of 3 hours. The product, recovered by centrifuging and drying, had an XRD pattern corresponding to ZSM-45. The first supernatant was not clear and yielded, after centrifuging at 11000 rpm and further washing, a colloidal dispersion with solids content 4.6%, of crystals of size about 100 nm, XRD showing the product to be ZSM-45, a LEV structure-type zeolite.

Solution A was prepared as described in Example 1 using the following components, in the proportions shown:

| | |
|---|---|
| NaOH | 61.66 |
| KOH | 28.73 |
| Al(OH)$_3$ (Alcoa, 99.3%) | 15.73 |
| H$_2$O | 190.30 |

300.23 parts of colloidal silica and 168.89 parts of water were poured into a mixer, and Solution A added together with 12.65 parts of rinse water. After mixing for 5 minutes, 16 parts of the 4.6% solids LEV slurry were added. The molar composition of the synthesis mixture was:

$3.8Na_2O:1.12K_2O:0.5Al_2O_3:10SiO_2:161H_2O$, with 927 ppm seeds.

The synthesis mixture was heated in an autoclave to 100° C. over 2 hours, and maintained at that temperature for 96 hours. After cooling, the content of the autoclave, a milky suspension, was washed five times with demineralized water and centrifuged at 9000 rpm. After taking a sample for XRD and SEM, the remainder was redispersed to form a colloidal solution, stable over several days, with a solids content of 6.4%. The XRD of the product shows it to be chabasite, with a uniform particle size 100×400 nm.

EXAMPLE 3

This example illustrates the use of colloidal LEV seeds in the manufacture of SAPO-34 of small particle size and uniform size distribution.

A synthesis mixture was prepared from the following components in the proportions shown.

| Solution | Component | Proportion |
|---|---|---|
| A | Al$_2$O$_3$ (Pural SB Condea 75%) | 68.18 |
| | H$_2$O | 100.02 |
| B | H$_3$PO$_4$ (Acros, 85%) | 115.52 |
| | H$_2$O, | 80.27 |
| C | Colloidal Silica (Ludox AS40) | 22.73 |
| | H$_2$O, rinse | 10.20 |
| D | TEAOH (Eastern Chemical, 40%) | 182.85 |
| E | DPA (Fluka) | 80.23 |
| F | Seeds, 4.6 Wt. % LEV | 31.95 |

Slurry A was prepared in a mixer, and Solution B added, when a viscous solution resulted. After leaving the solution to rest for 2 minutes, 26.84 parts of rinse water were added. After mixing the paste for 6 minutes, C was added, and mixed for 2 minutes before adding Solution D. Upon adding E with 70.72 parts of rinse water two phases were formed. After a further 3 minutes mixing a visually homogeneous solution resulted and after a further 10 minutes mixing the colloidal seeds F were added. The molar composition was:

$Al_2O_3:P_2O_5:0.3SiO_2:TEAOH:1.6DPA:56H_2O$.

+1860 ppm by weight LEV seeds.

The seeded gel was heated for 60 hours at 175° C. in a stainless steel autoclave. The solid product was recovered by centrifugation, washed 11 times with water to a conductivity of about 18 µs/cm, and dried at 120° C. XRD and SEM showed a pure SAPO-34 product with crystals between 0.2 and 1.3 µm, with a few crystals between 2 and 3 µm. Chemical analysis indicated a product of molar composition:

$Al_2O_3:0.99P_2O_5:0.36SiO_2$.

EXAMPLE 4

This example illustrates the use of the colloidal LEV structure type seeds in manufacturing mordenite.

7.20 parts of NaOH, 26.90 parts of KOH (87.3%), 11.32 parts of Al(OH)$_3$ and 75 parts of water were boiled until a clear solution was obtained, cooled, and water added to compensate for the weight loss on boiling to provide solution A. 229.83 parts of Ludox AS40 were combined with 256.93 parts of water in a beaker, to which was added a solution of 68.70 parts of TEAOH in 100.02 parts of water. Finally solution A was added; rinse water totalling 25.41 parts was also added. A smooth gel resulted, of molar composition:

1.22TEAOH:0.58Na$_2$O:1.37K$_2$0:0.47Al$_2$O$_3$:10SiO$_2$: 235H$_2$O.

The synthesis mixture was divided, and to one sample, A, a colloidal LEV slurry, contaminated with some OFF, total solids content 4.6% was added to give a seed level of 201 ppm. The other sample, B, remained unseeded.

Both synthesis mixtures were put into stainless steel autoclaves, and heated to 150° C. over 2 hours. Sample A was maintained at that temperature for 96 hours, sample B was maintained at that temperature for 240 hours, with samples being taken at 48 and 96 hours.

After 96 hours, crystals had settled on the bottom of the autoclave containing sample A. XRD and SEM analysis of the product recovered showed MOR, with crystal sizes between 0.2 and 1.0 µm, contaminated by a few OFF needles.

The 48 and 96 hours product samples from Sample B were amorphous; the 240 hours product contained MOR crystals of size range between 5 and 10 µm, with amorphous material and OFF needles contamination. The Sample A product analysed:

SiO$_2$:Al$_2$O$_3$, 15.5: 1.

The sample shows that seeding with colloidal LEV accelerates the formation of mordenite and reduces the crystal size.

EXAMPLE 5

This example further illustrates the use of LEV seeds in the manufacture of a non-LEV material, in this case ferrierite.

7.21 parts of NaOH, 26.92 parts of KOH, 11.31 parts of Al(OH)$_3$ and 75.02 parts of water were boiled until a clear solution was obtained, cooled, and water loss on boiling compensated to provide solution A. 229.87 parts of Ludox AS40 and 407.85 parts of water were poured into the beaker of a mixer and solution A added, together with 14.18 parts of rinse water, and mixed for 10 minutes to provide a smooth gel synthesis mixture of the molar composition:

0.58Na$_2$O:1.37K$_2$O:0.47Al$_2$O$_3$:10SiO$_2$:235H$_2$O.

The synthesis mixture was divided, and to one sample, A, the colloidal LEV slurry used in Example 4 was added to give a seed level of 207 ppm. The other part, Sample B, was unseeded. The samples were hydrothermally treated at the temperatures and times given in Example 4.

After 96 hours, crystals had settled on the bottom of the sample A autoclave. XRD and SEM analysis of the recovered product showed FER, in flake type crystals of about 2 µm length, contaminated with OFF needles. Chemical analysis gave SiO$_2$:Al$_2$O$_3$ of 15.6:1.

The 48 and 96 hours product samples from sample B were amorphous. After 240 hours, the sample B product contained FER crystals in admixture with amorphous material.

The examples show that organic template-free manufacture of ferrierite is accelerated by colloidal LEV crystals, and flake crystals result.

EXAMPLES 6 TO 8

These examples illustrate the use of LEV colloidal seeds to make FER zeolite without the use of an organic template, and the effect of using two different seed concentrations. A template-free synthesis mixture of the following molar concentration was prepared:

2.16K$_2$O:0.46Al$_2$O$_3$:10SiO$_2$:157H$_2$O and divided into three parts, samples A, B and C.

Sample A was unseeded.

Samples B and C (Examples 6 and 7) were seeded with a colloidal LEV seed slurry to levels of 260 ppm (Example 6) and 500 ppm (Example 7). Each sample was placed in a stainless steel autoclave, and heated at 200° C. for 96 hours. Unseeded Sample A produced an amorphous product, while both Samples B and C produced the desired FER zeolite. The product of Sample C had a SiO$_2$:Al$_2$O$_3$ molar ratio of 10:1. In a similar manner, a seeding level of 1000 ppm was used to produce, from a synthesis mixture (Example 8) having a molar composition of:

2.16K$_2$O:0.35Al$_2$O$_3$:10SiO$_2$:162H$_2$O, a FER zeolite with a SiO$_2$:Al$_2$O$_3$ molar ratio of 13:1.

EXAMPLE 9

This example illustrates the manufacture of FER type product using LEV washwater seeds to accelerate production and avoid the need for an organic template.

7.21 parts of NaOH, 26.92 parts of KOH, 11.31 parts of Al(OH)$_3$ were dissolved in 75.02 parts of water by boiling and with subsequent water loss compensation to form solution A. Colloidal silica (Ludox AS40), 229.87 parts, was mixed with 407.85 parts of water. Solution A was added, followed by 14.18 parts of rinse water, and the gel stirred for 10 minutes. A LEV washwater dispersion was added, the molar composition of the synthesis mixture then being:

0.58Na$_2$O:1.37K$_2$O:0.47AR$_2$O$_3$:10SiO$_2$:235H$_2$O plus 207 ppm LEV.

The synthesis mixture was heated in an autoclave to 150° C. over 2 hours, and maintained at that temperature for a total of 96 hours, after which time crystals had already settled on the vessel bottom. The product was FER, flake type crystals ~2 µm long, slightly contaminated with OFF needles. An unseeded mixture which was also heated to 150° C. over 2 hours was still amorphous after 240 hours at 150° C.

EXAMPLE 10

This example illustrates the use of colloidal LEV seeds to produce a different morphology of FER zeolite.

A synthesis mixture of the molar composition:

0.45Na$_2$O:3.1 pyridine:0.166Al$_2$O$_3$:10SiO$_2$:145H$_2$O was prepared and divided into two parts. One, Sample A, was seeded with sufficient 4.6% LEV slurry to give a seed level of 224 ppm. The other part, Sample B, was left unseeded. Both samples were placed in a stainless steel autoclave and heated in two hours to 150° C. and maintained at 150° C. for 140 hours. The unseeded product was largely amorphous, with traces of ZSM-5. The LEV-seeded product was pure ZSM-35, a FER structure type zeolite, with a flat plate-like morphology.

EXAMPLE 11

This example illustrates the effect of seeding level on particle size of FER.

A synthesis mixture similar to that of Example 1, first stage, was prepared, having a molar composition as follows:

1.95Na$_2$O:0.23K$_2$O:0.46Al$_2$O$_3$:10 SiO$_2$:4.15 choline chloride:157H$_2$O.

This mixture was divided, to one sample, A, were added sufficient colloidal LEV seed slurry prepared as in Example 3 to give a seeding level of 200 ppm, while the other sample, B, had a seeding level of 600 ppm.

Each sample was heated at 150° C. for 48 hours. The products, analysed by XRD and SEM, were identified as ZSM-38, a FER-type zeolite, as described in U.S. Pat. No. 4,046,859. In both cases, the crystals were intergrown plates, with the crystal size depending on seeding level; 600 ppm giving a mean crystal size of 0.7 μm, while 200 ppm gave a mean crystal size of 1.0 μm.

EXAMPLE 12

This example illustrates the use of colloidal LEV seeds to produce a Linde Zeolite T, of type structure ERI/OFF, and to control the morphology of the product.

The synthesis mixture used in Examples 6 to 8 was seeded with 200 ppm of the LEV slurry used there, and hydrothermal treatment carried out at 120° C. instead of the 200° C. used in those examples. The product was a disk-like crystallite of an intergrowth of ERI/OFF zeolite, known as Linde Zeolite T, as described in U.S. Pat. No. 4,126,813.

EXAMPLE 13

This example illustrates the control of particle size by seeding with LEV in the manufacture of a MAZ structure type zeolite. 32.38 parts of NaOH (98.6%) and 22.71 parts of Al(OH)$_3$ (98.5%) were dissolved in 63.37 parts of water by boiling, the solution cooled, and water loss compensated to form solution A. 17.60 parts of tetramethyl ammonium chloride (TMACl, 98%) were dissolved in 24.04 parts of water at room temperature in a high shear mixer and 218.78 parts of colloidal silica (Ludox HS-40, 40°%) added with stirring over 2 minutes, then 5.38 parts of a 4.6% aqueous colloidal LEV solution, prepared as in Example 3, added and mixed for 3 minutes. Solution A was then added with 27.19 parts rinse water, and stirred in for 5 minutes, to give a paste-like gel with a molar composition of:

2.74Na$_2$O:0.98Al$_2$O$_3$:1.1TMACl:10SiO$_2$:101H$_2$O with 600 ppm LEV seeds.

380 parts of gel were heated in a plastic bottle fitted with a condenser in a 98° C. oilbath for 135 hours. The resulting product was washed five times with 700 parts of water to a pH of 10.9, the product dried at 120° C. (yield 89.5 parts) and calcined in air for 24 hours at 510 to remove the TMA, weight loss 9.2%. Product yield: 21.4%, XRD analysis showed an excellently crystalline TMA-MAZ and SEM showed uniform 500 nm spherical agglomerates consisting of nanocrystallites.

An unseeded but otherwise identical synthesis mixture subjected in the same hydrothermal treatment yielded a TMA-MAZ product slightly contaminated with TMA-sodalite, formed of spherical particles with a broad size distribution (about 0.3 to 2.5 μm).

EXAMPLE 14 AND COMPARATIVE EXAMPLE 15

These examples illustrate the use of colloidal LEV seeds in controlling the particle size of offretite.

A synthesis mixture was prepared using TMACl as the template and Ludox AS40 as silica source. The molar composition was:

2.3K$_2$O:TMACl:Al$_2$O$_3$:10SiO$_2$:160H$_2$O.

One sample (Example 14) was seeded to a level of 202 ppm using a 4.6% solids content dispersion of colloidal LEV (see Example 3). The mixture was heated in an autoclave at 150° C. for 8 hours. The product was pure OFF, with crystals having a narrow size distribution, about 1 μm. The second sample, (Comparison Example 15), was left unseeded, and heated at 150° C. for 48 hours. The product was pure OFF, with particles sizes ranging between 1 and 5 μm.

EXAMPLE 16 AND COMPARATIVE EXAMPLE 17

These Examples illustrate the use of colloidal LEV seeds to control purity and particle size in ZSM-57 manufacture.

A synthesis mixture was prepared using N,N,N,N',N',N' hexaethylpentane diammonium bromide (R) as template, Ludox HS 40 as silica source, and Al$_2$(SO$_4$)$_3$.18H$_2$O as alumina source. The molar composition was:

R:2Na$_2$O:0.17Al$_2$O$_3$:10SiO$_2$:399.4H$_2$O

A first sample (Example 16) seeded with 175 ppm colloidal LEV was heated at 160° C. for 144 hours. The product was fully crystalline ZSM-57, with particle size about 1 μm.

A second sample (Comparison Example 17) was left unseeded, and heated at 160° C. Crystallization did not start until 14 days. After 24 days the product was a mixture of ZSM-57, quartz and other crystalline phases, the ZSM-57 material was platelets of about 3 μm diameter, mixed with other crystallites.

EXAMPLES 18 AND 19

These Examples illustrate the use of colloidal LEV seeds in the manufacture of a FER type zeolite, ZSM-38.

A synthesis mixture was prepared using sodium aluminate (Nobel, 53% Al$_2$O$_3$, 41% Na$_2$O) as the alumina source, Ludox HS 40 as the silica source and choline chloride (R, Aldrich)

as template. The mixture had the molar composition:

1.95Na$_2$O:0.24K$_2$O:0.46Al$_2$O$_3$:10SiO$_2$:4.17R:157H$_2$O

One sample was used unseeded, a second (Example 18) was seeded with a 4.6% solids content dispersion of colloidal LEV to a 200 ppm loading. Both samples were heated in autoclaves at 150° C. After 71 hours the unseeded sample was still amorphous. After 48 hours, the seeded sample had produced ZSM-38, an FER structure type zeolite (see U.S. Pat. No. 4,046,859), crystal size (intergrown plates) about 1.0 μm.

A third sample (Example 19) was similarly seeded but to a loading of 0.06%. After being similarly heated, the product was similar to that of Example 18, but the crystal size was smaller, at about 0.7 μm.

EXAMPLE 20

This example illustrates the effect of colloidal LEV and colloidal *BEA in the synthesis of ZSM-50 (structure type EUO). The use of colloidal LEV reduces the crystallization time needed under static conditions compared to a synthesis mixture seeded with colloidal *BEA of 80 nm particle size.

A solution A was prepared using the following ingredients in the proportions indicated:

| | |
|---|---|
| $Al_2(SO_4)_3.18H_2O$ | 18.98 |
| NaOH (98.7%) | 27.59 |
| $H_2O$ | 150.06 |

225.06 parts of colloidal silica (Ludox HS40) and 765.01 parts of water were poured together and mixed. Solution A was added using 21.38 parts of rinse water. After mixing, solution B, consisting 61.57 parts of hexamethonium bromide (R) in 100.49 parts of water was added using 20.82 parts of rinse water. To 798.64 parts of the mixture which was homogenized were added 3.032 parts of the 4.6 Wt. % colloidal slurry of LEV of Example 3. The final homogeneous mixture with the following molar composition:

$2Na_2O/R/0.17Al_2O_3/10SiO_2/401H_2O$ + 174 wtppm LEV was transferred to a 1 liter stainless steel autoclave and heated to 150° C. over 6 hours. Heating was continued for 168 hours. The sample was washed and dried and XRD and SEM showed ZSM-50, elliptical plates of length 1 μm.

A mixture with composition $2Na_2O/R/0.17Al_2O_3/10SiO_2/401H_2O$ + 142 wtppm *BEA was prepared and crystallized in the same way as above. A sample was taken after 168 hours of heating at 150° C. XRD showed very poor crystallinity. After 216 hours of heating the crystallinity of the recovered product increased. The product was fully crystalline ZSM-50 after 312 hours.

EXAMPLE 21

This example illustrates the use of LEV seeds in isostructural seeding, to accelerate the formation of LEV (ZSM-45).

A synthesis mixture was prepared as described in the first part of Example 1, except that instead of seeding with conventionally sized LEV seeds, the colloidal sol from the second supernatant of the second part of Example 1 was used, at a seeding level of 0.15% by weight of solids. The seeded synthesis mixture was heated in a stainless steel autoclave for 96 hours at 120° C., with a heat-up time of 3 hours. The product, recovered by centrifuging and drying, had an XRD pattern corresponding to ZSM-45. The first supernatant was not clear and yielded, after centrifuging at 11000 rpm and further washing, a dispersion with solids content 4.6%. The product consisted of crystals of size about 100 nm, XRD showing ZSM-45.

It can be seen that the use of washwater seeds, rather than regular sized seeds, reduces the synthesis time from 144 to 96 hours. This example also illustrates the formation of washwater seeds.

EXAMPLE 22

This example illustrates the use of the washwater seeds of Example 21 to accelerate the formation of LEV (ZSM-45).

Following the procedures of Example 21 and the first part of Example 1, a synthesis mixture was prepared, but seeded with the washwater seeds of Example 21 at a level of 0.02% by weight of solids. The synthesis mixture was heated at 120° C. and spot samples taken at intervals were washed, recovered by centrifuging and drying, and subjected to XRD analysis. Crystallization had begun at 24 hours, and was complete after 48 hours. The XRD pattern of the product corresponds to that of ZSM-45.

EXAMPLE 23

This example illustrates the use of the washwater seeds of Example 21 to accelerate the formation of LEV (NU-3).

A solution of 0.75 parts sodium aluminate (53% $Al_2O_3$, 42% $Na_2O$, 6% $H_2O$), 0.61 parts NaOH, and 161.06 parts of diethyldimethyl ammonium hydroxide (R,20.4% in water) was made up, and added to 33.35 parts of silica (90%) with 2 parts of rinse water, and mixed for 10 minutes to give a low viscosity gel of molar composition:

$0.27Na_2O:0.17Al_sO_3:10SiO_2:5.5R:154H_2O$.

To 120.58 parts of this mixture were added sufficient of the washed suspension of Example 21 to give a seeding level of 0.15% by weight, while the remainder of the mixture was left unseeded.

Both samples were treated in autoclaves for 96 hours at 130° C. While the unseeded product was very slightly hazy, it was still transparent and no product could be recovered. The seeded product contained a blue-white mother liquor and a solid phase on the autoclave base. After washing and drying the solid was observed by XRD analysis to have the pattern of NU-3 (a zeolite of LEV structure type) as set out in EP-A-40016. The particles were non-aggregated and had a particle size about 100 nm.

EXAMPLE 24

This example illustrates the use of LEV seeds to accelerate NU-3 formation.

6.35 parts of alumina (Catapal VISTA, 70%) were slurried in 19.99 parts of water. Quinuclidine (R, 97%), 7.2 parts, and $NH_4F$, 8.11 parts, were dissolved in 50.02 parts of water, and 7.2 parts of $H_2SO_4$ (97%) added dropwise with stirring. 29.01 parts of silica were placed in a mixer and the alumina slurry added, together with 15.02 parts rinse water. At very slow mixing speed, the slurry gelled the silica, and the quinuclidine solution was added with 35.81 parts of rinse water. The viscous gel was mixed for 5 minutes, to give a molar composition of:

$1.6H_2SO_4:5NH_4F:Al_2O_3:10SiO_2:5.3R:161H_2O$.

To 102 parts of this gel was added sufficient washwater seed suspension from Example 21 to give a seed loading of 0.06% by weight based on the total weight of the gel. The remainder was left unseeded. Both samples were heated at 170° C. for 192 hours. The products were washed and recovered by centrifuging and dried overnight at 120° C. The unseeded product was amorphous while the seeded product had the XRD pattern of NU-3, and SEM showed intergrown crystals of various morphology, of between 0.5 and 1.5 μm.

EXAMPLE 25

This example illustrates the use of the washwater seeds of Example 21 to accelerate zeolite formation and to control particle size and increase purity of ZSM-45 (LEV).

9.08 parts of sodium aluminate (as Example 2), 11.56 parts NaOH, and 3.10 parts KOH were dissolved in 85.75 parts of water by boiling and water loss compensated, to give solution A. Silica, 68.69 parts, was combined with water, 85.70 parts, and 60 parts choline chloride, and mixed at low speed. Then solution A was added, with 80.82 parts of additional water. The stirring speed was increased, and stirring continued for a further 5 minutes.

The washed suspension of Example 21 was added to part of the mixture to give a seeding level of 0.02% by weight, and a further part was left unseeded. Both samples were heated at 120° C. for 96 hours, and samples taken, product recovered, and dried overnight at 120° C. In the seeded sample, the XRD pattern was that of ZSM-45, consisting of spherical 1 μm aggregates built up of 100 nm particles. In the unseeded mixture, crystallisation had only just started; the mixture was subjected to a further 96 hours heating at 120° C. The product recovered was an impure ZSM-45, consisting of 6 μm aggregates.

We claim:

1. A colloidal suspension of a LEV structure type crystalline molecular sieve.

2. A suspension as claimed in claim 1, wherein the mean size of the LEV particles is within the range of from 5 to 1000 nm.

3. A suspension as claimed in claim 2, wherein the range is from 10 to 300 nm.

4. A suspension as claimed in claim 3, wherein the range is from 20 to 100 nm.

5. A suspension as claimed in claim 1, wherein the mean size of the LEV particles is at most 100 nm.

6. A method for preparing a colloidal suspension of a LEV structure type crystalline molecular sieve, which comprises synthesizing a LEV structure type crystalline molecular sieve by treatment of a synthesis mixture containing the elements necessary to form a LEV crystalline molecular sieve, separating the resulting LEV crystalline molecular sieve product from the synthesis mixture, washing the product, and recovering the resulting wash liquid comprising the colloidal suspension of a LEV structure type crystalline molecular sieve.

7. A method as claimed in claim 6, wherein the recovered wash liquid is the liquid resulting from the second or subsequent washing.

8. The product of the method of claim 6.

9. A process for the manufacture of a crystalline molecular sieve, which process comprises treating a synthesis mixture comprising elements necessary to form the molecular sieve and colloidal LEV crystalline molecular sieve seeds for a time and at a temperature appropriate to form the molecular sieve.

10. A process as claimed in claim 9, wherein the molecular sieve is of the LEV structure type.

11. A process as claimed in claim 10, wherein the molecular sieve is selected from the group consisting of Levyne, ZK-20, NU-3 and ZSM-45.

12. A process for the manufacture of a crystalline molecular sieve, which comprises treating a synthesis mixture comprising elements necessary to form a molecular sieve of a first structure type, other than LEV, and colloidal LEV molecular sieve seed crystals for a time sufficient and at a temperature appropriate to form the molecular sieve of the first structure type.

13. The invention as claimed in claim 12, in which colloidal LEV structure type seeds are used in the manufacture of a crystalline molecular sieve selected from the group consisting of the MFS, CHA, OFF, MOR, FEW MAZ, EUO and ERI/OFF, structure types.

14. A process as claimed in claim 13, wherein the crystalline molecular sieve manufactured is selected from the group consisting of chabasite, a phosphorus-containing molecular sieve of the CHA structure type, mordenite, ferrierite, Linde Zeolite T, mazzite, offretite, ZSM-57, ZSM-38, and ZSM-50.

15. In the synthesis of a crystalline molecular sieve other than of LEV structure type by thermal treatment of a synthesis mixture suitable for the manufacture of that molecular sieve, the improvement which comprises the step of adjusting the amount of colloidal LEV seed crystals to control the morphology of the product, wherein said amount has a range for 0.001 ppm to 10000 ppm.

16. The synthesis as claimed in claim 15, wherein colloidal LEV seeds are used to form Linde Zeolite T of disk-like morphology.

17. In the synthesis of a crystalline molecular sieve, the improvement which comprises the use of colloidal LEV seed crystals to control a characteristic of the resulting crystalline molecular sieve.

18. The synthesis as claimed in claim 17, wherein the characteristic is at least one member selected from the purity, the particle size, and the particle size distribution.

19. In the synthesis of a crystalline molecular sieve in the substantial absence of an organic structure-directing agent, the improvement which comprises the use of colloidal LEV seed crystals.

20. In the synthesis of a crystalline molecular sieve, the improvement comprising the use of colloidal LEV seed crystals to accelerate the formation of the product.

21. A process for hydrocarbon conversion, separation, or adsorption, said process comprising the step of contacting a hydrocarbon feedstock with a crystalline molecular sieve obtained by the treatment of a synthesis mixture comprising colloidal LEV seed crystals and elements necessary to form the molecular sieve for a time and at a temperature appropriate for the formation of the said crystalline molecular sieve under conditions sufficient to convert, separate, or adsorb said hydrocarbon feedstock.

22. A process of oxygenate conversion, said process comprising the step of contacting an oxygenate with crystalline molecular sieve obtained by the treatment of a synthesis mixture comprising colloidal LEV seed crystals and elements necessary to form the molecular sieve for a time and at a temperature appropriate for the formation of the said crystalline molecular sieve under conditions sufficient to convert said oxygenate.

* * * * *